May 24, 1949.　　　　　E. W. DAVIS　　　　　2,471,062
FISH SCORING MACHINE
Filed July 12, 1946　　　　　　　　　　　　3 Sheets-Sheet 1
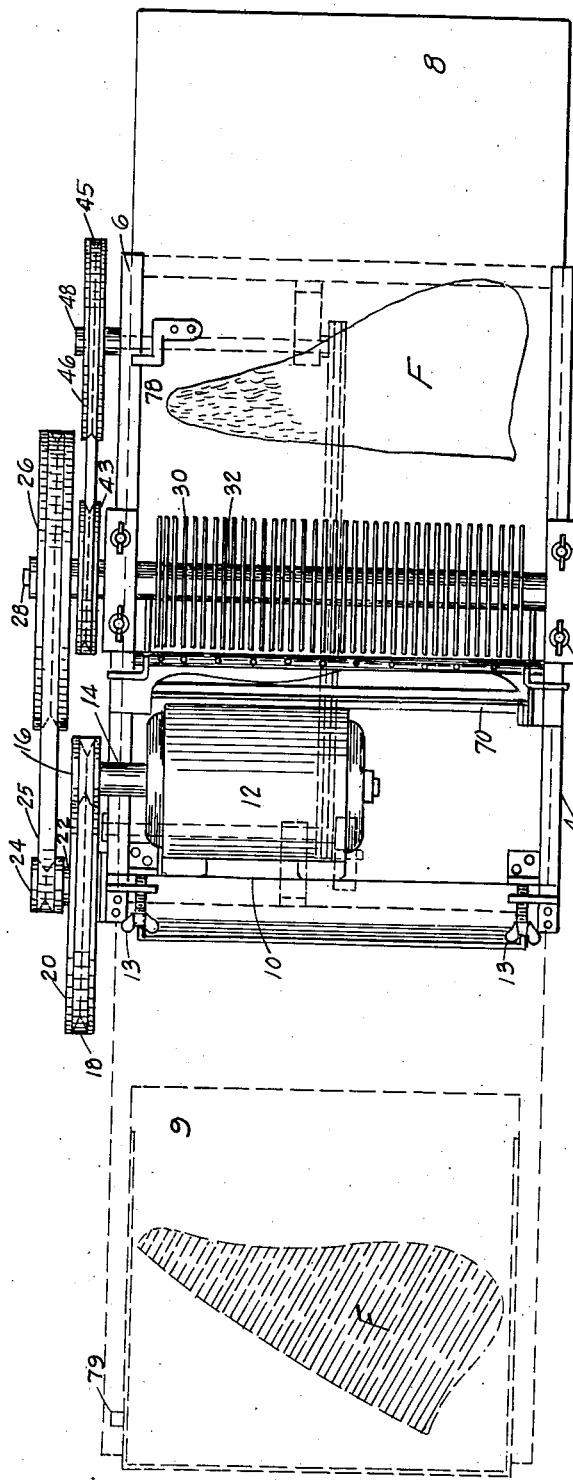
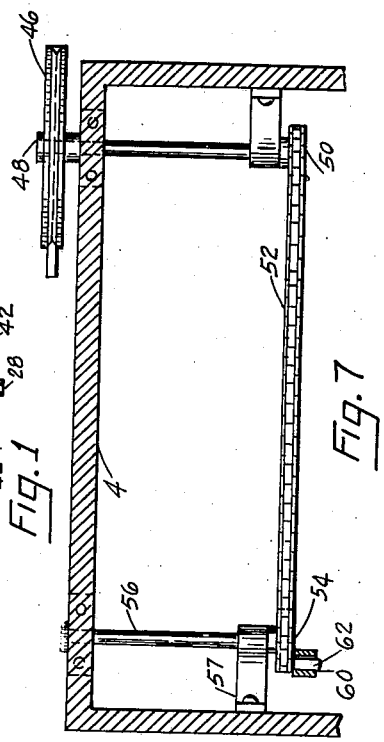
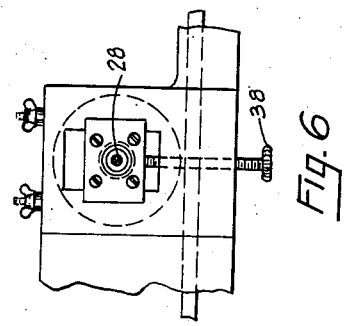
INVENTOR.
EUGENE W. DAVIS
BY *Victor J. Evans & Co.*
ATTORNEYS

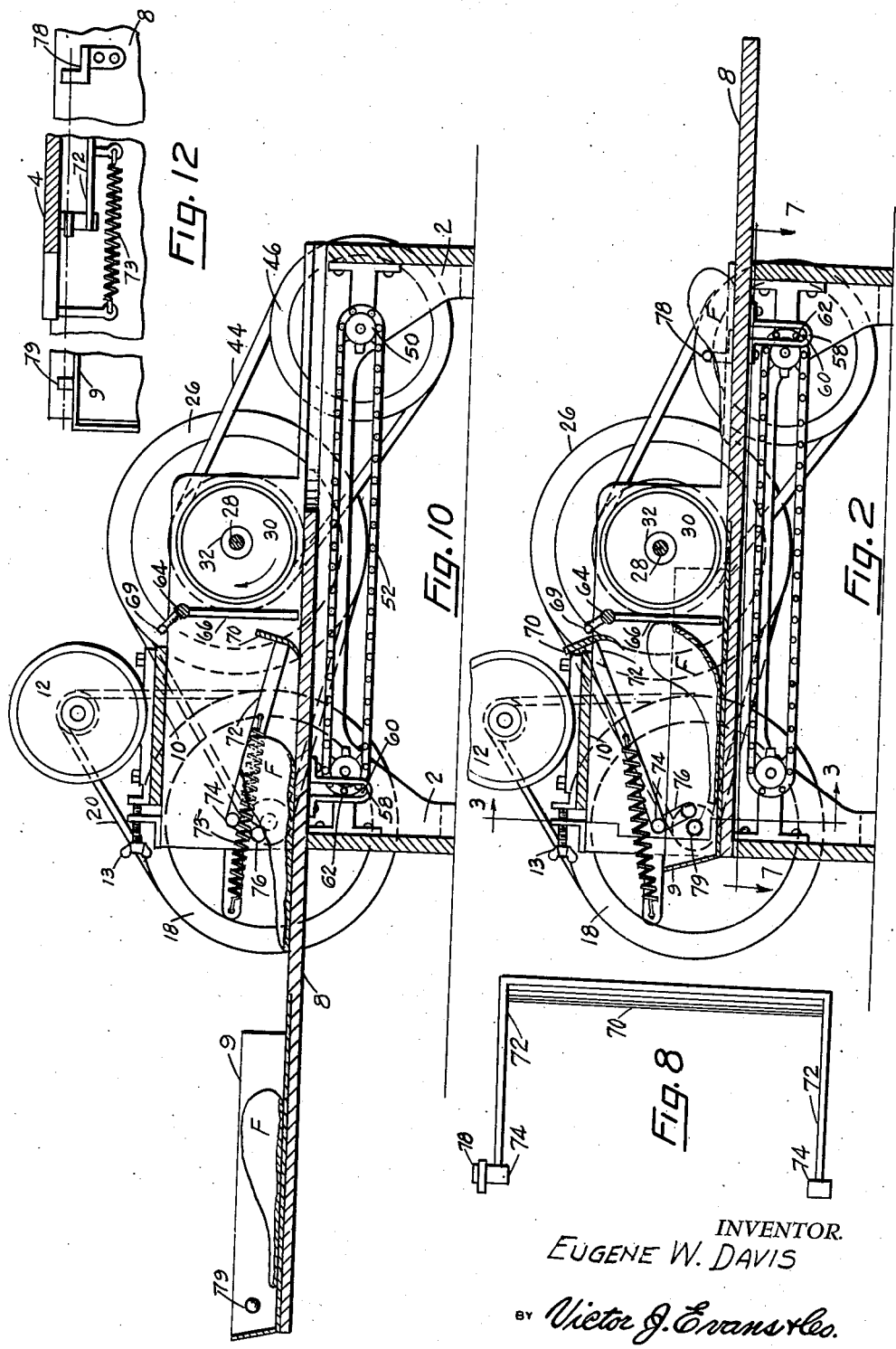

May 24, 1949.
E. W. DAVIS
2,471,062
FISH SCORING MACHINE
Filed July 12, 1946
3 Sheets-Sheet 3
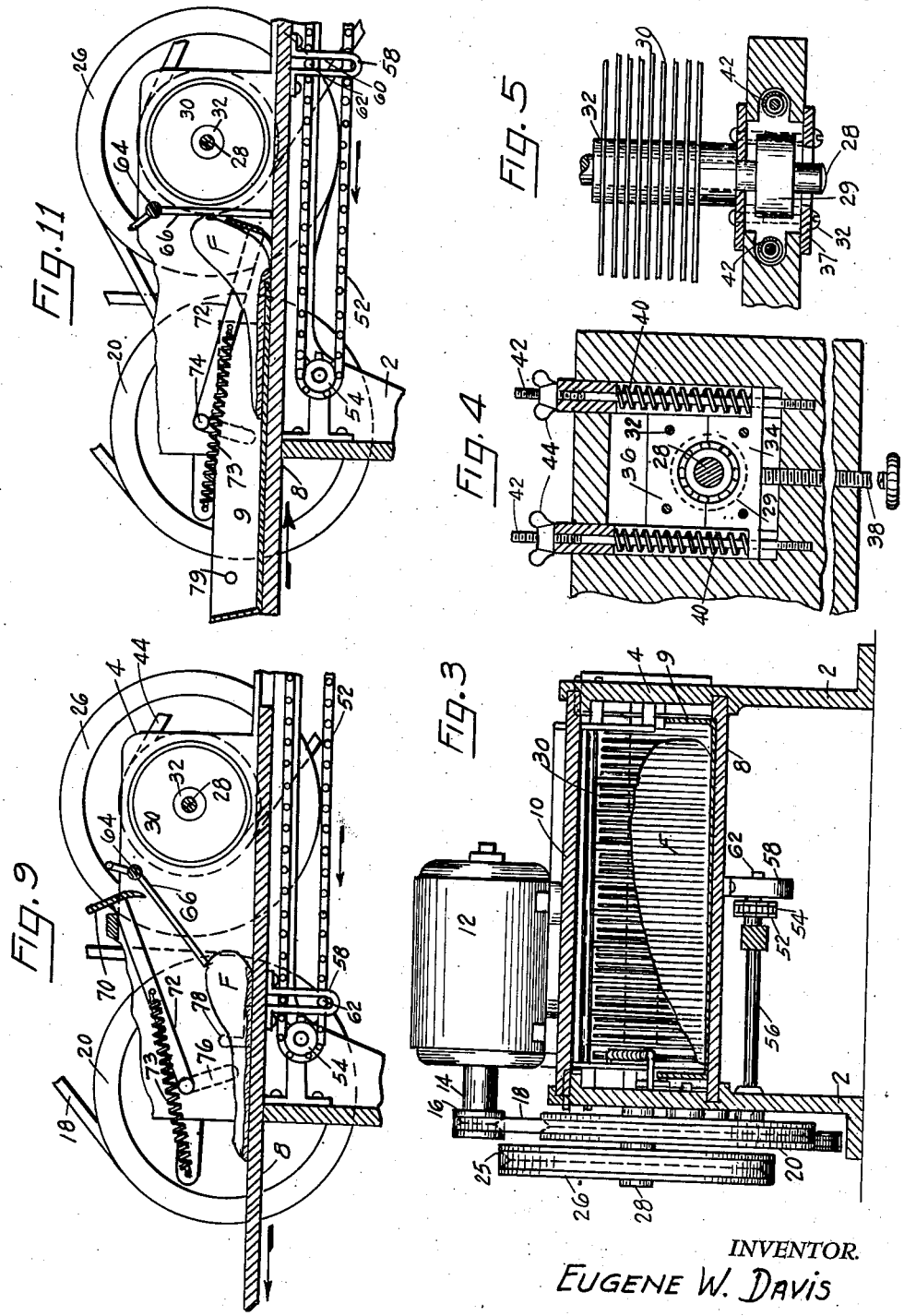
INVENTOR.
EUGENE W. DAVIS
BY Victor J.Evans&Co.
ATTORNEYS Patented May 24, 1949

2,471,062

UNITED STATES PATENT OFFICE 2,471,062

FISH SCORING MACHINE

Eugene W. Davis, Meredosia, Ill.

Application July 12, 1946, Serial No. 683,199

7 Claims. (Cl. 17—2)

My present invention relates to an improved fish scoring machine of the type especially adapted for preparing fish such as carp for consumption.

According to my invention after the fish has been filleted and the backbone removed, many small bones remain in the fillet and it is the purpose of the machine of my invention to score the fillet from the inside toward the skin by the use of rotary disk knives which will slice through the fillet but not the skin and will thereby cut through the small bones thus making the fillet edible without the necessity of the consumer removing the bones. The thin bones cut into short lengths may be eaten with no ill effect upon the consumer, and the fillets thus treated by my invention become more readily saleable and considerable time and labor are saved in the preparation of the fillet.

In the accompanying drawings I have illustrated one complete example of the physical embodiment of my invention according to the best mode I have thus far devised but it will be understood that various changes and alterations may be made in the exemplified structure within the scope of the appended claims.

In the drawings—

Figure 1 is a top plan view of the fish scoring machine of my invention.

Figure 2 is a longitudinal vertical sectional view showing the work feeding board at the end of the return stroke.

Figure 3 is a transverse vertical sectional view at line 3—3 of Figure 2.

Figure 4 is a detail view of the disk cutter adjuster.

Figure 5 is a horizontal sectional view thereof.

Figure 6 is a side elevational view thereof.

Figure 7 is a horizontal sectional view of the work feeding board drive mechanism.

Figure 8 is a plan view of the scraper.

Figure 9 is a longitudinal vertical sectional view showing the mechanism in position after a fillet has been scored.

Figure 10 is a longitudinal vertical sectional view of the scorer with the work board at the outward limit of its movement and ready to return.

Figure 11 is a longitudinal vertical sectional view showing the last scored fillet being caught by the scraper as the board returns under the disks.

Figure 12 is a detail view of the trip means for the scraper.

Referring now to the drawings wherein like characters indicate like parts, I have illustrated the fish scoring machine of my invention comprising the supporting legs 2 and the side 4 and 6. The work board 8 is slidably secured upon the sides and carries thereon at one end a pan 9 to receive the scored fillets.

On the top 10 of the machine I have mounted a motor 12 of conventional design and adjustment screws 13 provide means for tightening or loosening the belt drive as becomes necessary with use. The motor 12 has a shaft 14 upon which is secured a pulley or sheave 16 and the belt 18 drives the wheel 20 mounted upon the shaft 22.

A small sheave 24 on the shaft 22 carries a belt 25 to wheel 26 on shaft 28 supported in bearings 29, and the cutter disks 30 are spaced as at 32 on the shaft 28, for rotation therewith. Journals blocks 34 and 36 covered by plate 37 may be adjusted to vary the depth of the cut of the disks by means of the adjustment screw 38 against the tension of the springs 40 surrounding the rods 42 having thumb screws 44.

A sheave 43 on the shaft 28 drives a belt 45 and wheel 46 on the shaft 48, and a gear on the inner end of this shaft as 50 carries and drives a sprocket chain 52. At the opposite end the chain is carried by a gear 54 journaled on shaft 56 which is supported from the machine as at 57.

A U-shaped guide 58 is secured to the board in close proximity to the chain and in the slot 60 of the guide a traveling roller 62 secured to a link of the chain provides the reciprocating motion for the work board 8.

Thus as the roller on the chain follows its orbit of travel about the two gears for the chain, the guide and the board supporting the guide reciprocates back and forth with the travel of the roller.

A fish fillet F is placed on the board 8 at the right in the drawings, and with the motor operating the rotary disks revolve and the board carrying the fillet F travels under the disks and the fillet receives scores from the disks.

After the fillet passes under the disks it strikes the guard 64 having depending fingers 66 and pivoted at 68 with a stop 69 opening or pivoting the guard and passing thereunder. Gravity pulls the guard back into substantially vertical position to prevent a fillet from passing back under the disks as the board returns, see Figure 9.

A scraper 70 having arms 72 is pivoted at 74 and a spring 73 off center with relation to the arms urges the scraper either into the position of Figure 9 or of Figure 11. A link 76 depends from the arms and this link lies in the path of a trip 78 on the board to lower the scraper, and in the path of a trip 79 on the pan to raise the scraper. Thus after the fillet has been scored the trip 78 lowers the scraper and as the board moves to the left in the drawings in its return stroke, the scraper now in lowered position catches the fillet and forces it into the pan 9 which slides thereunder.

As the board moves to the extreme of its return movement the trip 79 strikes the link 78 to raise the scraper and the fish just scraped into the pan moves backward or to the left with the pan and remains there until removed by the operator.

It will be apparent from the above description of the structure and of its operation that the machine of my invention is simple in operation and will efficiently perform its functions. It is only necessary to place a fillet on the right hand side of the board when the machine is operating and the machine will thereafter automatically carry the fillet under the rotary knives, and will convey the scored fillet to the receiving pan.

The machine of my invention presents a vast improvement over the prior manual methods of scoring such fish fillets, and the machine being durable will operate over a long period of time without mechanical attention.

Having thus fully described my invention what I claim as new and desire to secure by Letters Patent is:

1. In a fish scoring machine the combination with a series of rotary knives and a work board having a reciprocating movement thereunder, of a receiving pan for the scored fish at one end of the board, means for scraping a scored fish into the pan, and means for successively raising and lowering the scraper as the board reciprocates.

2. In a fish scoring machine the combination with a series of rotary knives and a work board having a reciprocating movement thereunder, of a receiving pan for the scored fish at one end of the board, a scraper pivotally mounted on the machine and having a board contact position and a raised position, resilient means for retaining the scraper in position, and means on the board for tripping the scraper.

3. In a fish scoring machine the combination with a series of rotary knives and a work board having a horizontal cycle of movement including a feed stroke and a return stroke, of a receiving pan at one end of the board, a scraper pivotally mounted on the machine and having a board contact position and an elevated position, and means on the board for raising the scraper on the feed stroke, and for lowering the scraper on the return stroke.

4. In a fish scoring machine the combination with a series of rotary knives and a work board having a reciprocating movement including a feed stroke and a return stroke, of a receiving pan at one end of the board, a scraper pivotally mounted on the machine having raised and lowered positions, an arm on the scraper, and means on the board for tripping the arm to raise the scraper on the feed stroke and lower the scraper on the return stroke.

5. In a fish scoring machine the combination with a series of rotary knives and a work board having a reciprocating movement including a feed stroke and a return stroke, of a receiving pan on one end of the board, a scraper pivotally mounted on the machine and having raised and lowered positions, an arm on the scraper, and trip lugs at opposite ends of the board successively engaging the arm to raise the scraper on the feed stroke and lower the scraper on the return stroke.

6. In a fish scoring machine the combination with a series of rotary knives and a work board having a reciprocating movement including a feed stroke and a return stroke, of a receiving pan at one end of the board, a scraper pivotally mounted on the machine having raised and lowered positions, an arm on the scraper and trip lugs at opposite ends of the board intermittently engaging the arm to raise the scraper on the feed stroke and lower the scraper on the return stroke, and spring means disposed diagonally on the scraper for releasably securing the scraper in tripped position.

7. In a fish scoring machine the combination with a series of rotary knives and a work board having a reciprocating movement including a feed stroke and a return stroke, of a receiving pan at one end of the board, a scraper pivotally mounted on the machine having raised and lowered positions, an arm on the scraper and trip lugs at opposite ends of the board intermittently engaging the arm to raise the scraper on the feed stroke and lower the scraper on the return stroke, spring means diagonally disposed with relation to the scraper for releasably securing the scraper in tripped position, and a vertical pivoted guard between the scraper and the knives.

EUGENE W. DAVIS.

REFERENCES CITED

The following references are of record in the file of this patent:

UNITED STATES PATENTS

| Number | Name | Date |
| --- | --- | --- |
| 1,986,073 | Spang | Jan. 1, 1935 |
| 2,191,732 | Spang | Feb. 27, 1940 |
| 2,288,010 | Meland | June 30, 1942 |